July 10, 1951 O. PLAWCZYK 2,559,898

RADIO AND INTERCOMMUNICATION APPARATUS AND SYSTEM

Filed Sept. 2, 1948 2 Sheets-Sheet 1

Inventor:
Owsiej Plawczyk,
by Singer, Ehlert, Stern & Carlberg
Attorneys.

July 10, 1951 O. PLAWCZYK 2,559,898

RADIO AND INTERCOMMUNICATION APPARATUS AND SYSTEM

Filed Sept. 2, 1948 2 Sheets-Sheet 2

Inventor:
Owsiej Plawczyk,
by Singer, Ehlert, Stern & Carlberg
Attorneys.

Patented July 10, 1951

2,559,898

UNITED STATES PATENT OFFICE 2,559,898

RADIO AND INTERCOMMUNICATION APPARATUS AND SYSTEM

Owsiej Plawczyk, London, England

Application September 2, 1948, Serial No. 47,444
In Great Britain September 9, 1947

7 Claims. (Cl. 179—1)

This invention is concerned with electric wave intercommunication systems and apparatus and has for an object the provision of such systems and apparatus which afford novel facilities in respect of dual-purpose equipment.

A particular object of the invention is the provision of such a novel system and apparatus for inter-office or other intercommunication service which, for the purpose of obtaining amplification of intercommunication signals, is adapted to have operatively coupled thereto a complementary unit in the form of an independently usable portable or transportable radio receiver-amplifier.

According to one feature of the invention an electric wave intercommunication system comprises a main-station unit, which is operatively associated with one or more sub-station units and is arranged and adapted to have coupled electrically thereto a complementary but independently usable radio receiver-amplifier unit, and control means whereby said latter unit, when so coupled, can be employed as an amplifier for intercommunication signals.

According to another feature of the invention, such an electric wave intercommunication system includes means whereby a sound and electric wave interconverting device of the radio receiver-amplifier unit serves as a loudspeaker when the main-station unit is being used for reception and as a microphone device when the main-station unit is being used for transmission. Thus the device, for example a moving coil transducer, provides service as a loudspeaker for radio reception, when the radio receiver-amplifier is operated independently of the intercommunication system, and also as a loudspeaker or microphone device in respect of intercommunication signals.

According to a further feature of the invention an electric wave intercommunication apparatus constituting a main-station unit adapted for co-operation with one or more sub-station units, comprises means whereby a complementary but independently usable portable or transportable radio receiver-amplifier unit can be coupled electrically thereto and control means whereby said latter unit, when so coupled, can be brought into operation as an amplifier for intercommunication signals.

According to a still further feature of the invention, an electric wave intercommunication apparatus constituting a dual purpose unit, namely an amplifier for intercommunication signals or alternatively an independently usable portable or transportable radio receiver-amplifier, comprises means, in addition to radio receiving means, whereby the unit can be detachably coupled electrically for use with an established part of an intercommunication system.

The electrical intercoupling of the main-station unit and the radio receiver-amplifier unit and the nature of the control means can be such as to permit the latter unit, when so coupled, to be employed as an amplifier for intercommunication signals or as a radio receiver alternatively. Such an arrangement also may provide facilities for relaying the radio-programme signals over at least a part of the intercommunication network.

In addition to the said electrical intercoupling, the main-station unit can be arranged and adapted to provide for mechanical connection between itself and the radio receiver-amplifier unit. For example, the main-station unit can be formed or provided with one part of a system of interlocking parts, adapted to receive a co-operating part which is formed or provided on the complementary unit. Conveniently the main-station unit can constitute a base upon which the radio receiver-amplifier unit can be mounted in a readily removable manner. In some cases electrical intercoupling and mechanical interlocking of the two units can be effected by common means, for example plug and socket fittings which form fixed parts of the respective units.

Other features in the invention will be mentioned during the course of the description now to be given with reference to the accompanying drawings which illustrate, by way of example, one embodiment of the invention and wherein.

Figure 1:
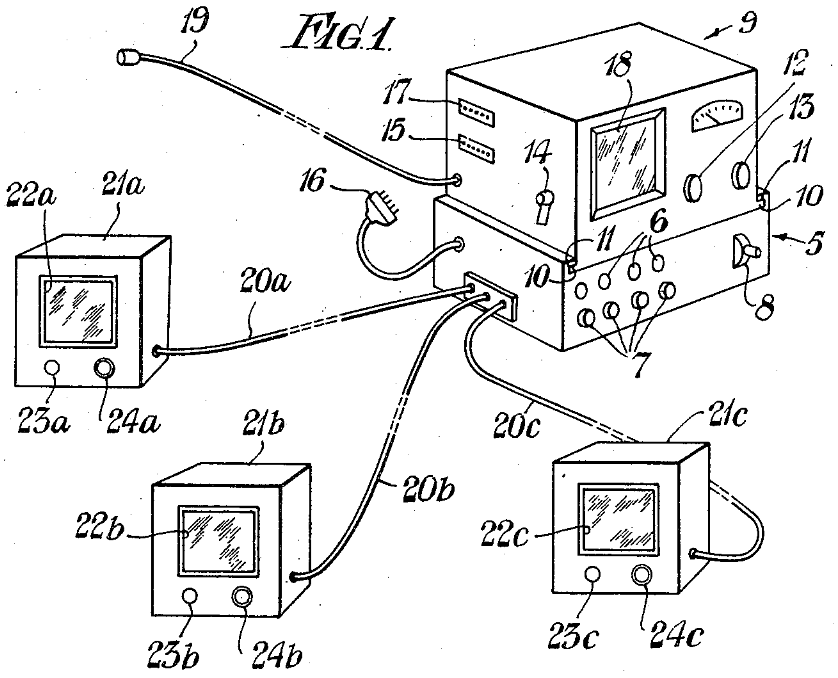
Fig. 1 is a pictorial representation of an electric wave intercommunication system and apparatus according to the invention, this arrangement providing intercommunication facilities between a main-station unit and three sub-station units.

Referring first to Fig. 1, a main-station unit is indicated at 5 and comprises a casing, for example a plastic moulding, which serves to accommodate or carry certain electrical devices including indicator lamps 6, switch-operating press buttons 7 and a key switch 8 for purposes hereinafter to be described. This unit constitutes a supporting base for a complementary radio receiver-amplifier unit 9 which is removably attached to the base through the intermediary of flanges 10 on the unit 9 engaging with grooves 11 of the unit 5.

This receiver-amplifier is a self-contained unit which can be operated as a radio receiver even when it is divorced from the intercommunication system and comprises a combined on/off switch and volume control 12, a tuning control 13, a "radio" or "intercom" selector 14, a socket 15 for the reception of a co-operating plug 16 (shown disconnected) whereby electrical intercoupling between the units 5 and 9 is obtained, a socket 17 for the reception of a co-operating plug on another unit (Fig. 3) and a moving coil loudspeaker arranged behind an opening 18 in the casing. The receiver-amplifier is adapted to be energised from A. C. or D. C. electric supply means through a lead 19. Alternatively this unit can be energised from an electric battery in conjunction with a vibratory type high tension supply equipment, as will hereinafter be described, this facility enabling the unit to be operated in locations where an electric mains supply is not available, for example in a road or other vehicle.

Cables 20*a*, 20*b*, 20*c* serve to interconnect electrically the main-station unit 5 and the sub-station units 21*a*, 21*b*, 21*c*. Each of the latter comprises a casing, for example a plastic moulding, which accommodates a moving coil loudspeaker, arranged behind an opening 22*a*, 22*b*, 22*c*, and includes an indicator lamp 23*a*, 23*b*, 23*c* and switch 24*a*, 24*b*, 24*c*.

The circuit arrangement of the system and apparatus shown in Fig. 1 is indicated diagrammatically in Fig. 2 and that portion pertaining to the radio receiver-amplifier unit will now be described. To simplify the drawings the greater part of the radio frequency section of this receiver-amplifier is not shown in detail, it being deemed sufficient for the understanding of the invention to indicate that the control grid of an electronic valve V1 receives input signals by way of a change-over switch 25 (operated by selector 14, Fig. 1) from a tuned circuit 26, the latter being coupled, by a coil 27, to preceding radio signal stages which are indicated in block form at 28 and receive a radio input from an antenna 29. These radio signal stages can be designated to operate according to a superheterodyne or signal-frequency principle.

The valve V1 is adapted to function as a detector in respect of radio signals and, for the alternative position of the switch 25, as an amplifier for audio frequency intercommunication signals which are available across the secondary of a transformer 30.

The audio signal output of the valve V1 is obtained across an anode resistor 31 and is applied, through a capacitor 32, to the control grid of a power valve V2, the anode circuit of which includes the primary of an output transformer 33.

Control grid bias for the valves V1 and V2 is obtained by means of a cathode resistor 34 shunted by a capacitor 35, in respect of V1 and resistors 36 and 37, the latter being shunted by a capacitor 38, in respect of V2.

In the case of A. C. mains operation, the H. T. supply for this receiver-amplifier is obtained by means of a half-wave electronic valve rectifier 39 which is energised, through voltage dropping resistors 40 and 41, by the supply mains connected across terminal points 42 by means of the cable 19 (Fig. 1). When a D. C. supply mains is employed the rectifier 39 is not called upon to perform its rectifying function. The H. T. supply for V2 is taken direct from the cathode of the rectifier 39 and from across a reservoir capacitor 43 whilst in the case of V1 and preceding stages, the H. T. supply is taken by way of a resistor 44 and from across a smoothing capacitor 45. The on/off switch 12 is inserted in the mains supply circuit.

In addition to the provision of the switch 25 and the transformer 30, which are departures from normal radio set design, the arrangements whereby this unit is coupled electrically to the main-station unit are also departures from normal radio set practice. These coupling arrangements comprise the 5-way socket 17, for the reception of the plug 16, which provides electrical intercoupling in respect of a lead 46 of the mains supply circuit, one end of the coil of a moving coil loudspeaker 47 forming a permanent part of the radio receiver-amplifier unit, one end of the primary of the transformer 30, a lead 48 connected to the "earthy" chassis of the unit and one end of the secondary winding of the output transformer 33. The socket 17 also includes make and break switching contacts 49 which normally are closed and serve to connect the lead from the loudspeaker 47 to the lead from the secondary winding of the transformer 38 but, upon the insertion of the plug 16, are opened by the plunger 50 of the plug 16 to isolate, so far as this coupling is concerned, the said two leads and maintain such isolation until the plug is removed from the socket.

The main-station unit 5 comprises, in addition to the plug 16, a double pole change-over set of contacts 51 and a single pole make and break set of contacts 52. These sets of contacts 51 and 52 constitute elements of the lever switch 8 (Fig. 1), the set 51 being actuated when the lever is moved from the central position to the lower position and the set 52 being actuated when the lever is moved from the central to the upper position.

The main-station unit also comprises make and break switches 7*a*, 7*b*, 7*c* and 7*x*, which can be actuated, individually, through the intermediary of the push-buttons 7 (Fig. 1). Electric indicator lamps 6*a*, 6*b*, 6*c* and 6*x* are provided and in addition the provision of an audible indication is made available by providing a bell or buzzer 53 which is shunted across the resistor 54, this latter facility being in addition to the buzzer effect obtainable from the use of the loudspeaker 47 of the radio receiver-amplifier unit.

Each of the three sub-station units 21*a*, 21*b* and 21*c* comprises its indicator lamp 23*a*, 23*b* and 23*c*, its switch 24*a*, 24*b* and 24*c*, and a loudspeaker 55*a*, 55*b* and 55*c* respectively. These three units are connected to the main-station unit 5 by means of the three-line cables 20*a*, 20*b* and 20*c*, respectively.

Figure 2:
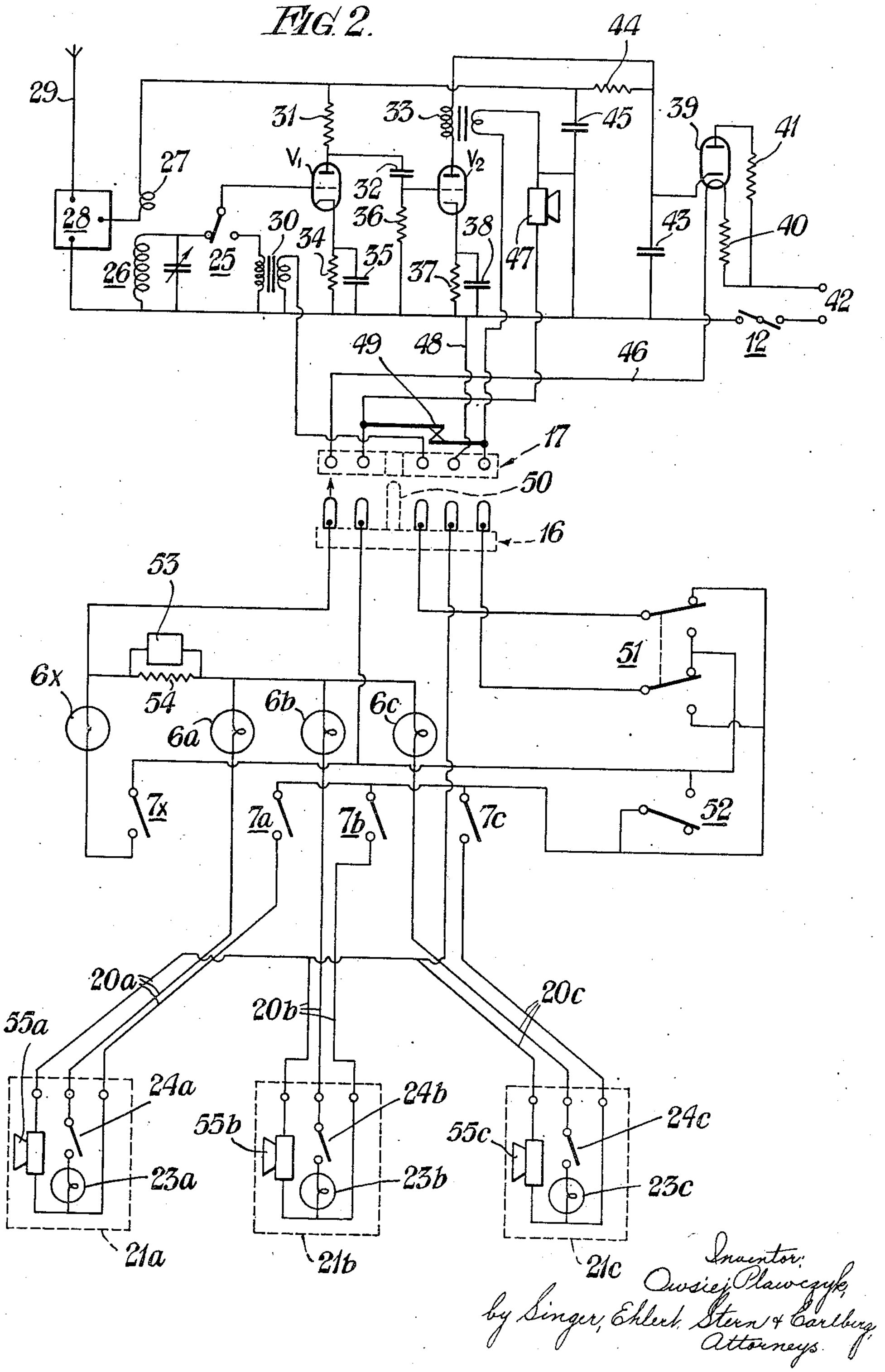
Fig. 2 shows diagrammatically the circuit arrangement of the system and apparatus shown in Fig. 1.

The electrical interconnection of the elements of the units shown in Fig. 2 are such, when the plug 16 and socket 17 are coupled, as to provide the following facilities:

Let it be assumed that the apparatus is being energised from A. C. supply mains and switch 12 has been closed. For "intercom" service, selector switch 25 is changed over from the condition shown in Fig. 2 and any one of the sub-stations can be called by operation of the appropriate switches. For example, to call sub-station 21*a*, switch 7*a* is operated, lever switch 8 is moved to the lower position to change over the contacts 51 and calling switch 7x is operated. These three switching operations have for effect to connect the main supply, by way of lead 46, lamp 6x, switch 7x, contacts 51, to the primary of the transformer 30, so that an alternating wave signal is applied to the grid of valve V1. Thus there appears across the secondary of the output transformer 23 a corresponding alternating wave signal. This output signal is applied, by way of switching contacts 52 and switch 7a, to the loudspeaker 55a of the sub-station unit 21a, thus producing an audible calling signal in respect of this sub-station. Upon release of the calling switch 7x the calling signal will terminate. If the main-station operator then desires to listen to the operator at sub-station 21a speaking into the loudspeaker unit 55a, he must move the lever switch back to the middle position, for which the switching contacts 51 revert to the condition shown in the drawing. The electric wave signals, created by the loudspeaker 55a functioning as a microphone in respect of the operator's voice, are passed by way of switch 7a and contacts 51 to the primary of the transformer 30, are applied to the grid of valve V1 and hence will appear, amplified, across the secondary of the output transformer 33. These output signals are applied, by way of switching contacts 52, to the loudspeaker 47, thus establishing telephonic intercommunication between the operator at the sub-station and the operator of the main-station. When the operator at the main-station desires to speak to the operator at the sub-station, he merely moves the lever switch to the lower position in order to change over the contacts 51. For this latter circuit condition, electric wave signals, generated by reason of the main-station operator speaking into the loudspeaker 47, are applied by way of switching contacts 51 to the primary of the transformer 30 and hence, after amplification, from the secondary of the transformer 33 by way of switching contacts 51 and 7a to the loudspeaker 55a of the sub-station.

If the operator at a sub-station desires to call the operator at the main-station, he has to operate the calling switch on his sub-station unit. Thus, if the operator of sub-station unit 21a desires to call the main-station operator, he must close the calling switch 24a which serves to close the mains-energised circuit comprising the lead 46, resistance 54, buzzer 53, indicator lamp 6a, indicator lamp 23a and loudspeaker 55a. The closing of this circuit and the consequent energisation of indicator lamp 5a and buzzer 53 will give a visual and audible indication to the main-station operator that sub-station 21a is calling. The main-station operator should then close the corresponding switch 7a and, assuming that by this time the operator at the sub-station has released his calling switch, can either listen for speech from the sub-station operator or, after moving the lever switch 8 to the lower position, can speak to the sub-station operator.

In similar manner the sub-station units 21b and 21c can be brought into service at will by operation of the appropriate switches and, in view of the foregoing description in respect of sub-station 21a and the comparative simplicity of the circuit arrangement shown in the drawing, it is deemed unnecessary to describe these circuit connections in detail.

For radio reception, the selector 14 is operated to bring switch 25 into the condition shown in Fig. 2, for which condition carrier wave signals appearing across the tuned circuit 26 are applied to the control grid V1 for detection, the resulting radio programme signals appearing across the secondary of the output transformer 33. When the lever switch 8 is in the central position these radio programme signals are applied to the loudspeaker 47 by way of the switching contacts 51. If it is desired to relay these radio programme signals to one or more of the sub-stations while also maintaining the signals at the main-station, the lever switch 8 is moved to the upper position which has for effect to close the circuit switching contacts 52. In addition, it is necessary to operate one or other of the switches 7a, 7b or 7c according to which sub-station is to be provided with the signals. For example, if it is desired that the sub-station unit 21b shall be so energised, the switch 7b is operated, for which circuit condition the signals appearing across the secondary of the output transformer 33 will, in addition to being applied to the loudspeaker 47 by way of switching contacts 51 to provide a programme at the main-station, also be applied by way of said contacts 51, contacts 52 and switch 7b to the loudspeaker 55b of the sub-station unit 21b. If desired all the sub-stations can be supplied with the signals simultaneously. In circumstances where it is desired not to have the radio programme at the main-station, lever switch 8 is moved to the lower position which brings about a change-over of the switching contacts 51 so that the signals appearing across the secondary of the output transformer 33 are now applied by way of the said contacts 51 to the switches 7a, 7b, and 7c, for distribution to the sub-stations if desired, but not to the loudspeaker 47.

If at any time during the course of relaying radio programme signals, the operator at a sub-station desires to use the apparatus for "intercom" service, he can, by operating the calling switch (24a, 24b or 24c), give to the operator at the main-station the audible and visual indications hereinbefore described. It is of course also possible for the operator at the main-station at any time to terminate the radio programme relay and use the apparatus for "intercom" service.

When the radio receiver-amplifier unit 9 is uncoupled from the main-station unit 5, the disengagement of the plug 16 from the socket 17 results in the automatic closing of the switching contacts 49 which serve to connect the speaker 47 across the secondary of the output transformer 33, thus enabling the unit 9 to be operated independently of the intercom system.

As an alternative to energising the apparatus from A.C. supply mains, the circuit arrangements shown in the drawings can also be energised from a D. C. supply mains, the H. T. supply for the radio receiver-amplifier unit 9 being of the so-called universal type.

Figure 4:
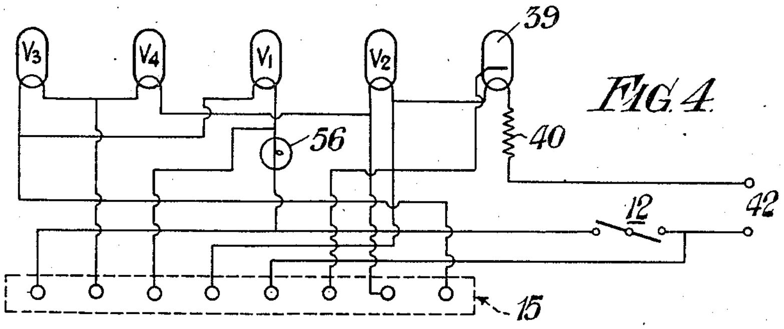
Fig. 4 shows diagrammatically the heater circuit connections of the electronic valves in said radio receiver-amplifier unit.

Furthermore, the apparatus can be energised from a battery, for example a motor-car battery, and for this purpose the radio receiver-amplifier unit 9 is provided with the socket 15 for the reception of a plug whereby such an alternative power supply unit can be coupled thereto. The electrical interconnections between the eight-way socket 15 are shown in Fig. 4, from where the interconnections of the heaters of the valve V1 and V2, the rectifier 39 and also valve V3 and V4 of the high-frequency stages of the radio receiver circuit, and their association with the terminals 42 of a mains supply circuit will be seen. Fig. 4 also shows the inclusion of an indicator lamp 56 for the radio receiver-amplifier unit.

Figure 3:
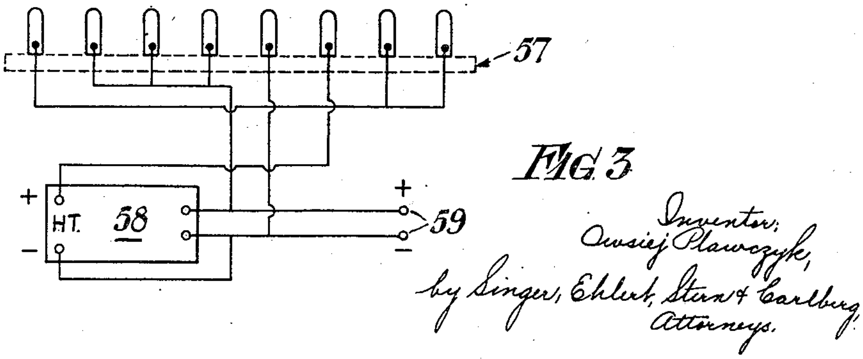
Fig. 3 shows diagrammatically the circuit arrangement of an alternative power supply unit for the radio receiver-amplifier unit shown in Figs. 1 and 2.

The alternative power supply unit is shown in Fig. 3 and includes an eight-way plug 57 for use with the socket 15. This supply unit also incorporates an H. T. converter 58 of the vibratory type which is adapted to be energised by a suitable battery which can be connected across terminals 59. The electrical interconnections of this unit are clearly shown in the drawing.

What I claim and desire to secure by Letters Patent of the United States of America is:

1. An electric wave intercommunication system comprising a main station unit, a plurality of sub-station units, means electrically connecting said sub-station units to said main station unit, a separate radio receiver-amplifier unit capable of use independently of said station units, means mechanically coupling said radio receiver-amplifier unit and said main station unit, means electrically coupling said radio receiver-amplifier unit and said main station unit, and control means for selectively effecting operation of said radio receiver-amplifier unit as a radio receiver or as an amplifier for said main station unit and said sub-station units.

2. An electric wave intercommunication system comprising a main station unit, a plurality of sub-station units, means electrically connecting said sub-station units to said main station unit, a separate radio receiver-amplifier unit capable of use independently of said station units, means mechanically coupling said radio receiver-amplifier unit and said main station unit, means electrically coupling said radio receiver-amplifier unit and said main station unit, first control means for selectively effecting operation of said radio receiver-amplifier unit as a radio receiver or as amplifier for said main station unit and said sub-station units, and second control means for selectively controlling the electrical connection between each of said sub-stations and said main station.

3. An electric wave intercommunication system comprising a main station unit, a plurality of sub-station units, means electrically connecting said sub-station units to said main station unit, a radio receiver-amplifier unit adapted to be detachably connected mechanically to said main station unit, whereby said radio receiver-amplifier unit is independently usable as a radio receiver, and means electrically coupling said radio receiver-amplifier unit to said main station unit, whereby said radio receiver-amplifier unit is usable as a radio receiver or as an amplifier for said main station unit and said sub-station units.

4. An electric wave intercommunication system comprising a main station unit, a plurality of sub-station units, means electrically connecting said sub-station units to said main station unit, a radio receiver-amplifier unit detachably connected mechanically to said main station unit and including a radio receiver and an amplifier, means electrically coupling said radio receiver and said amplifier, other means electrically coupling said main station unit and said amplifier, and control means for selectively controlling the electrical connections between said radio receiver and said amplifier, between said main station unit and said amplifier and between said main station unit and said sub-station units.

5. An electric wave intercommunication system comprising a main station unit, a plurality of sub-station units, means electrically connecting said sub-station units to said main station unit, a radio receiver-amplifier unit detachably connected mechanically to said main station unit whereby said radio receiver-amplifier unit is usable independently of said station units, and means electrically coupling said radio receiver-amplifier unit and said main station unit, said radio receiver-amplifier unit including an electric wave interconnecting device usable as a loudspeaker when said main-station unit is being used for reception and as a microphone when said main-station unit is being used for transmission.

6. An electric wave intercommunication system comprising a main station unit, a plurality of sub-station units, means electrically connecting said sub-station units to said main station unit, a radio receiver-amplifier unit detachably connected mechanically to said main station unit whereby said radio receiver-amplifier unit is usable independently of said station units, means electrically coupling said radio receiver-amplifier unit and said main station unit, and control means for selectively effecting operation of said radio receiver-amplifier unit as a radio receiver or as an amplifier for said main station unit and said sub-station units, said radio receiver-amplifier unit including a moving coil transducer usable as a loudspeaker for radio reception when said radio receiver-amplifier unit is operated as a radio receiver, as a loudspeaker when said main station unit is being used for reception from said sub-station units, and as a microphone when said main station unit is being used for transmission to said sub-station units.

7. An electric wave intercommunication system according to claim 1, wherein said electrical coupling means and said control means are arranged to provide facilities for relaying radio program signals received by said radio receiver-amplifier unit when used as a radio receiver to said sub-station units.

OWSIEJ PLAWCZYK.

REFERENCES CITED

The following references are of record in the file of this patent:

UNITED STATES PATENTS

| Number | Name | Date |
|---|---|---|
| 1,922,415 | Bank | Aug. 15, 1933 |
| 2,087,027 | Glaser | July 13, 1937 |
| 2,157,140 | Molin | May 9, 1939 |
| 2,159,632 | Morey | May 23, 1939 |
| 2,186,500 | Schnell | Jan. 9, 1940 |
| 2,409,481 | Fordham | Oct. 15, 1946 |